June 2, 1970  C. W. BAUGH  3,515,419
CONTAINER FASTENER
Filed July 1, 1968  2 Sheets-Sheet 2

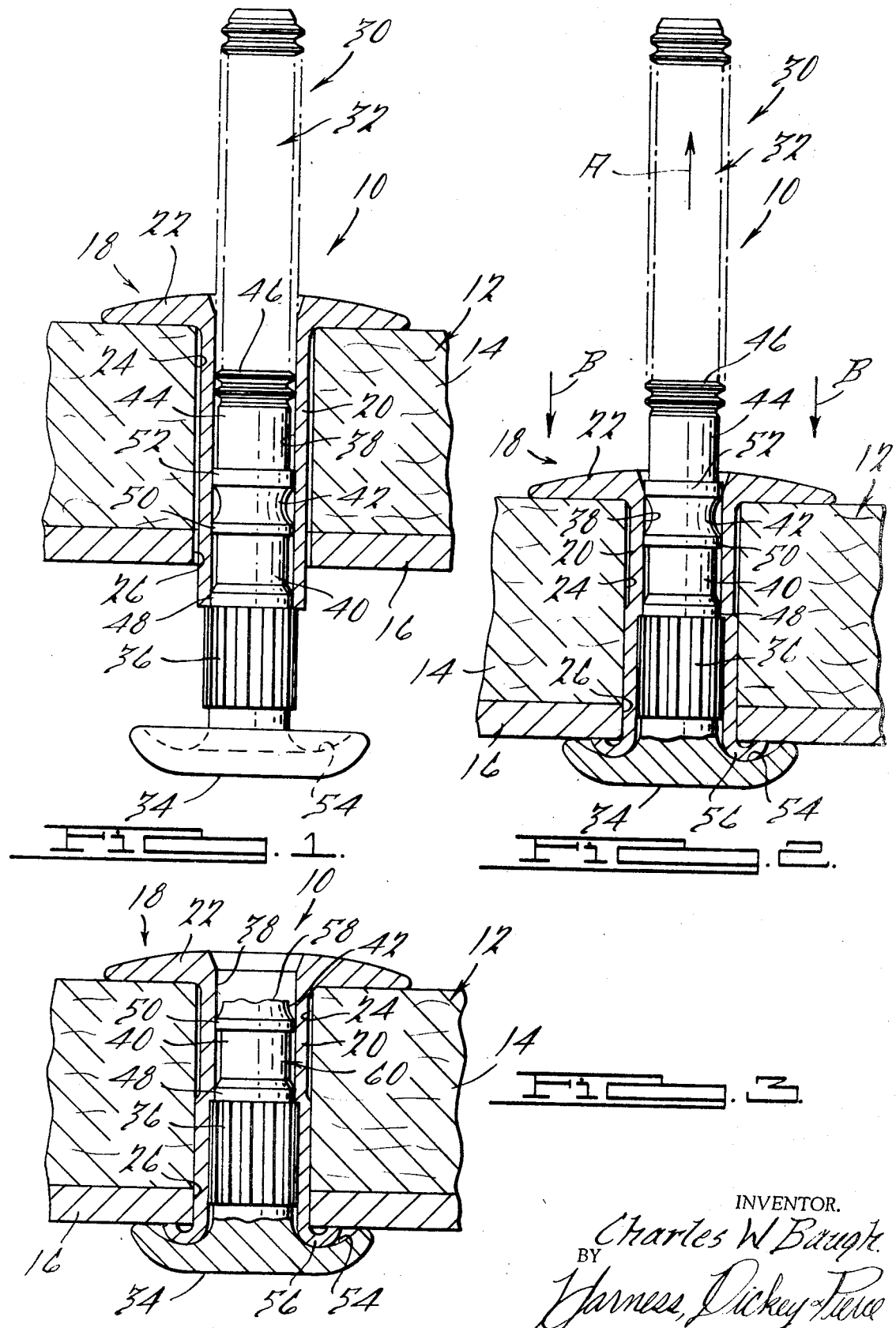

INVENTOR.
Charles W. Baugh
BY
Harness, Dickey & Pierce
ATTORNEYS.

United States Patent Office 3,515,419
Patented June 2, 1970

3,515,419
CONTAINER FASTENER
Charles W. Baugh, St. Clair Shores, Mich., assignor to Huck Manufacturing Company, Detroit, Mich., a corporation of Michigan
Filed July 1, 1968, Ser. No. 741,688
Int. Cl. F16b *19/08*
U.S. Cl. 287—189.36     11 Claims

ABSTRACT OF THE DISCLOSURE

A two-piece fastener, including a pin and a sleeve, with the sleeve being set by engagement with the head of the pin and with the pin being retained in the sleeve with a friction lock and further with the pin having a shallow breakneck groove to minimize pin bounce.

Summary—Background of invention

The present invention relates to a two-piece fastener, including a pin and a sleeve. For a large shipping container, it is desirable to have a fastener assembly which is a deterrent to tampering from the outside of the container. This is met by the two-piece fastener of the present invention which includes a pin and a sleeve. Both the pin and the sleeve have enlarged heads to provide good bearing surfaces and also to present a generally smooth contour with the associated wall of the container. The pin is of the pull type, i.e. with pull grooves, and extends through the sleeve and has an enlarged head used to upset the shank end of the sleeve whereby the container walls are held together. The sleeve, as set, then has an enlarged head on the interior of the container and an upset head exteriorly of the container. However, the upset head is located under, and covered by, the enlarged head of the pin which remains connected with the upset sleeve. Thus, to dismantle the container from the outside, first the pin head and then the upset sleeve head must be removed. This provides a deterrent to tampering, as well as a good structural joint. Therefore, it is an object of the present invention to provide a novel two-piece fastener, including a pin and a sleeve.

It is another object of the present invention to provide a two-piece fastener of the above type for large shipping containers which act as a deterrent to tampering.

In the two-piece fastener of the present invention, the pin and sleeve are held together by a friction lock. The pin is of the pull type, having pull grooves and a breakneck groove at which the excess portion of the pin will be severed and removed after the fastener has been set. It has been found that excessive pin bounce at fracture of the breakneck can result in loosening of the remainder of the pin in the sleeve; it was further found that this can be avoided by the use of a unique, modified breakneck groove construction. Therefore, it is an object of the present invention to provide a novel breakneck groove construction for a pull type pin for a friction lock fastener.

Other objects and advantages of the invention will become apparent from the subsequent description and the appended claims, taken in conjunction with the accompanying drawings, in which:

FIG. 1 is an elevational view with some parts shown in section of the fastener assembly of the present invention and shown in assembly relation with a container wall;

FIG. 2 is an elevational view similar to FIG. 1, showing the fastener assembly after it has been partially set;

FIG. 3 is a view similar to FIG. 2, showing the fastener assembly after it has been set.

Figure 4:
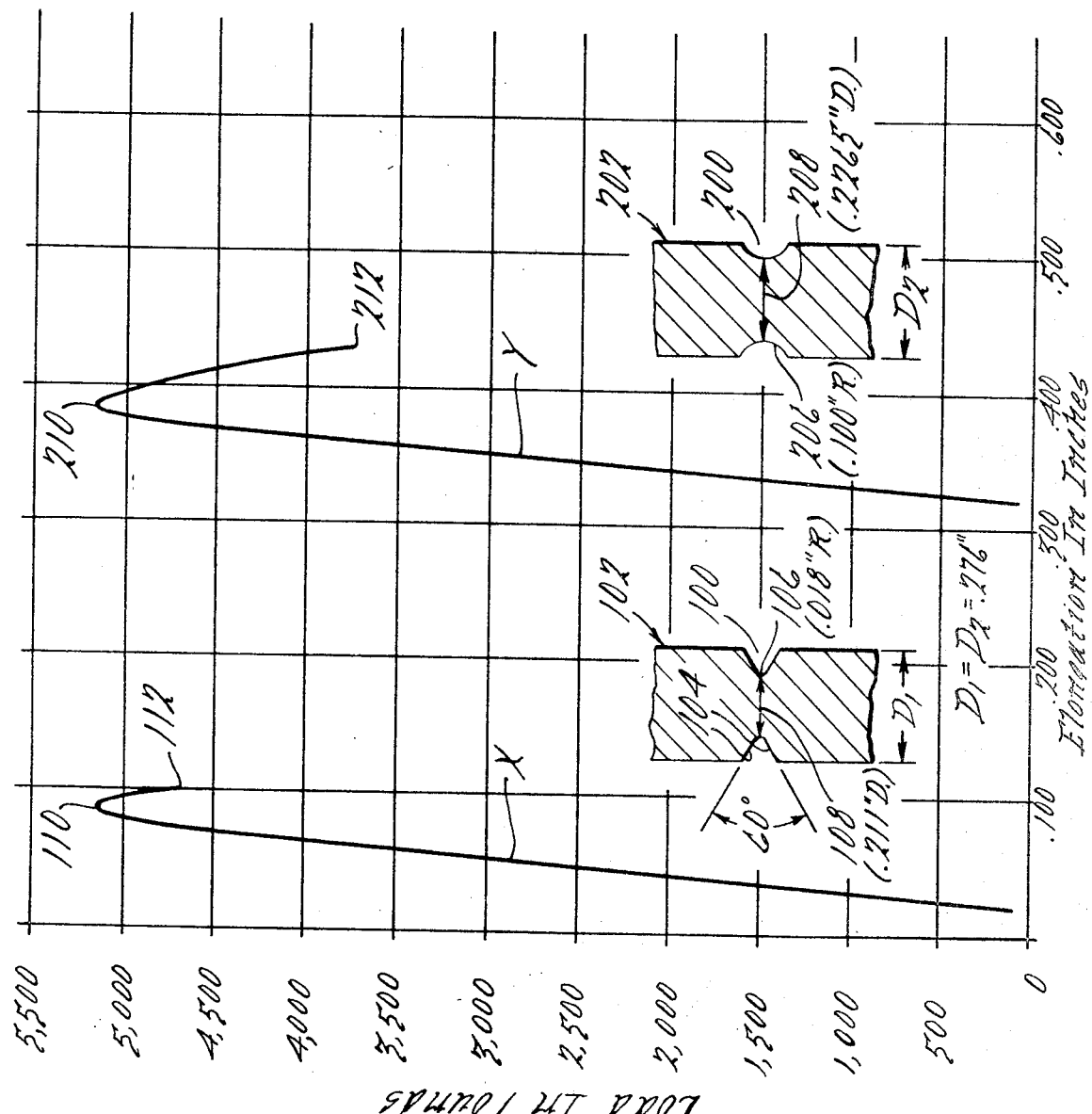
FIG. 4 is a graph showing the relationship of load to elongation for pins having different breakneck configurations.

Looking now to FIGS. 1–3, a two-piece fastener assembly 10 is shown assembled with a wall structure 12 for a shipping container, which structure 12 can include a fibrous or wood inner member 14 and a metal outer member 16.

The assembly 10 includes a sleeve 18 having a tubular shank 20 with an enlarged head 22; the sleeve 18 has the shank 20 extending through aligned bores 24 and 26 in the members 14 and 16, respectively, with the head 22 engaging the member 14 on the inside surface of the container. The shank 20 extends partially beyond the outer end of bore 26 in member 16 for a purpose to be seen. The assembly 10 also includes a pin 30, which has a shank 32 located in the tubular sleeve 18, and an enlarged head 34 located at the end of the pin shank 32, opposite from the sleeve head 22. A splined portion 36 is located adjacent the pin head 34 and is defined by axially extending grooves; the splined portion 36 is of a diameter slightly greater than the diameter of the substantially uniform bore 38 through the sleeve 18. Adjacent the splined portion 36 is a straight cylindrical portion 40 of a reduced diameter which is followed by a shallow breakneck groove 42 and another straight cylindrical portion 44 of reduced diameter. A plurality of pull grooves 46 extend from the portion 44 for the remainder of the pin shank 32. Generally annular lands 48, 50 and 52 are located between portions 36 and 40, portions 40 and 42 and portions 42 and 44. The lands 48, 50 and 52 along with the crests of pull grooves 46, generally define the maximum diameter of that part of the pin shank 32 and are of a diameter to be snugly received in bore 38 through sleeve 18.

Looking now to FIG. 2, the fastener assembly 10 is set by the application of a relative axial force applied between the pin 30 and sleeve 18 by a tool (not shown) having a construction known in the art. The tool has jaws for gripping the pull grooves 46 and an anvil engageable with the sleeve head 22 whereby the pin will be pulled (in the direction of arrow A) by the jaws and the force reacted (in the direction of arrow B) by the tool anvil against the sleeve head 22. The enlarged head 22 of sleeve 18 provides for substantial bearing area, whereby crushing of the inner member 14 is prevented.

Looking to FIG. 2, as the pin 30 is pulled relative to sleeve 18, the splined portion 36 will enter the outer end of bore 38, the end of the sleeve shank 20 expanding radially outwardly, causing the expanded outer wall to tightly engage the confronting portions of the surfaces of bores 24 and 26. As the pin 30 is pulled further, the inner surface 54 of the pin head 34 will engage the outer end of the sleeve shank 20. The inner surface 54 is flared arcuately radially outwardly such as to cause the outer end of the sleeve shank 20 to be bent or folded radially outwardly, resulting in the formation of an enlarged, turned head 56 which will grip the outside surface of the outer member 16, whereby the sleeve 18 will grip and hold the inner and outer members 14 and 16 together. The volume under the surface 54 of pin head 34 is selected to adequately receive a preselected maximum extension of the outer end of sleeve shank 20. This same fastener assembly could be used to secure members having a greater thickness as long as there was a sufficient extension of sleeve shank 20 to form an adequate head. Thus, the fastener assembly 10 can accommodate some variation in material thickness of members 14 and 16. Note that when the pin 30 has been fully pulled, the splined portion 36 will have been located substantially completely within the confines of bores 24 and 26 and, hence, will have radially expanded a substantial portion of sleeve shank 20 to further enhance the connection of the sleeve 18 to the members 14 and 16.

Upon a further increase in relative axial force, the shank 32 of the pin 30 will be severed at the breakneck groove 42 with the fractured end 50 being located within the sleeve 18 such that a smooth surface is provided on the interior of the container (see FIG. 3). The breakneck 42 is designed to be the weakest part of the pin 30 and to fracture at a preselected load which is higher than that to form the folded head 56. Note that the portion 60 of the pin 30 remaining with the sleeve 18 will be held to the sleeve by the frictional engagement therebetween. This friction lock is enhanced by the engagement of the splined portion 36 with the sleeve shank 20.

Note that with the set fastener, smooth surfaces are provided both interiorly and exteriorly of the container. In order for the fastener to be removed from the outside of the container, i.e. from the side facing the member 16, it is first necessary to remove the pin portion 60; next, the folded head 56 must be removed and finally the sleeve 18 removed. With such an elaborate process required, the fastener assembly 10 provides a positive deterrent to tampering, while providing a good connection.

With a friction lock fastener of the above type, it is desirable that the pin portion 60 be retained as tightly as possible to the sleeve 18. In setting the fastener, however, a certain amount of pin bounce will occur upon pin break as a result of energy stored prior to pin break. It has been found that with conventional breakneck groove constructions, the pin bounce can be excessive resulting in a poor, if any, friction lock between sleeve 18 and pin portion 60. It was discovered that this could be overcome by modifying the breakneck construction. Looking now to FIG. 4, the curve X depicts a curve for axial load vs. elongation for a conventional breakneck groove 100 in a pin 102. The conventional breakneck 100 is designed to have a substantial notch effect and as such has generally straight sides 104 inclined at 60° towards each other and connected by a small radius 106 with the groove 100 extending to a reduced diameter 108. The curve X shows that the ultimate load 110 and the fracture load 112 for the breakneck groove 102 are proximate in magnitude to each other (i.e. fracture 112 is around 91.5% of ultimate). For application in which the pin is mechanically locked to the collar this is desirable, and a high notch effect is deliberately obtained to provide a high ultimate load (sufficient to assure setting of the fastener) with a closely following fracture load to prevent excessive elongation which could result in an excessively protruding pin break portion (corresponding to end 58). With high fracture loads, however, the energy released at fracture is substantial and for friction lock fasteners, this can result in loosening of the pin and sleeve. In the present invention it has been found that a modified breakneck having a reduced notch effect and a greater difference between ultimate and fracture loads results in a substantial reduction in pin bounce and a reduction in possible degradation of the friction lock. Thus, with curve Y (FIG. 4) a modified breakneck 200 for a pin 202, otherwise identical to pin 102, results in nearly the same ultimate load 210 but a substantially reduced fracture load 212 (i.e. fracture 212 is around 73% of ultimate 210). Note that the ultimate loads 110 and 210 are determined by the maximum load required to set the fastener and hence for any one fastener must be the same. As noted with pin 202, the notch effect of breakneck 200 was substantially reduced (compared to breakneck 100) and this was accomplished by making groove 200 shallower than groove 100 and completely defined by a large radius 206 extending to a diameter 208 greater than diameter 108. With a breakneck 200 pin bounce was not objectionable and the degradation of the friction lock was minimized. A general indication of the dimensional relationship of pin 102 and 202 can be seen from the dimensional information in FIG. 4. The curves X and Y are for a pin made from a medium carbon steel.

It is submitted that the exact relationship between ultimate and fracture loads can be varied from one application or design to the next and can be readily determined by design and test following much the same procedures employed in adopting conventional breakneck grooves to different designs. It is believed that a breakneck groove for a friction lock fastener should have a reduced notch effect which can be provided by a generally shallow breakneck with the breakneck providing a fracture load less than around 90% of the ultimate. It is believed that better results are obtained with the breakneck providing a fracture load less than around 80% of the ultimate and, of course, good results can be obtained when fracture is around 75% of ultimate.

It is to be understood that the above description is intended merely as a brief description of the invention and as a means of convenient reference but that it not be in any way limiting on the invention described herein or the scope or interpretation of the appended claims.

What is claimed is:

1. A two-piece fastener for fastening workpieces having aligned openings comprising: a tubular sleeve having an enlarged sleeve head engageable with one surface at one side of the workpieces and a sleeve shank extending through openings and beyond the opposite surface at the other side of the workpieces, a pin having a pin head engageable with the outer end of said sleeve shank opposite said sleeve head and having a pin shank extending through said sleeve and beyond said sleeve head, pull means on said pin shank adapted to be gripped by a tool whereby a relative axial force can be applied between said pin and said sleeve, a breakneck groove defining the weakest point of said pin shank and located intermediate said pin head and said pull means, said pin head being of a size to over engage said outer end of said sleeve and having deformation means in the form of a concave annular surface defined by the inner surface of said pin head and engageable with said outer end of said sleeve for deforming said outer end to fold radially outwardly under said pin head as said pin is pulled relative to said sleeve to form a formed head for gripping the opposite surface of the workpieces, a friction lock means for holding said pin and said sleeve together after fracture of said breakneck groove and including an enlarged diameter portion on said pin in frictional engagement within said sleeve.

2. The fastener of claim 1 with said friction lock means comprising a splined portion on said pin shank adapted to expand said outer end radially, outwardly and to interferingly engage said sleeve shank.

3. The fastener of claim 1 with said breakneck groove being shallow whereby pin bounce at fracture is minimized.

4. The fastener of claim 1 with said breakneck groove having a fracture load less than around 90% of its ultimate.

5. The fastener of claim 1 with said breakneck groove having a fracture load less than around 80% of its ultimate.

6. The fastener of claim 1 with said breakneck groove having a fracture load around 75% of its ultimate.

7. The fastener of claim 4 with said breakneck groove being shallow and with said inner surface extending generally arcuately and radially, outwardly.

8. The fastener of claim 7 with said friction lock means comprising a splined portion on said pin shank adapted to expand said outer end radially, outwardly and to interferingly engage said sleeve shank.

9. The fastener of claim 8 with said breakneck groove located on said pin shank such that at fracture it is totally confined within said sleeve.

10. The fastener of claim 9 in combination with a wall structure for a container with said pin head being located on the outer surface of said wall structure for the container whereby tampering is deterred.

11. The fastener of claim 10 with the inner wall surface of said wall structure being a compressible material and with said sleeve head being of a size to prevent excessive deformation of said material.

References Cited

UNITED STATES PATENTS

| | | | |
|---|---|---|---|
| 742,206 | 10/1903 | Maurer | 85—39 |
| 2,501,567 | 3/1950 | Huck | 85—78 |
| 2,803,984 | 8/1957 | Swenson | 85—77 |
| 3,065,661 | 11/1962 | Kolec et al. | 85—78 |
| 3,257,889 | 6/1966 | Fischer | 85—70 |
| 3,257,890 | 6/1966 | Kraemer | 85—77 |
| 3,286,580 | 11/1966 | Jeal | 85—77 |

FOREIGN PATENTS 640,865　5/1962　Canada.

MARION PARSONS, JR., Primary Examiner

U.S. Cl. X.R.

85—39, 70, 78